Sept. 27, 1955  A. SZEGVARI  2,719,009
METHOD OF PRODUCING AN ELASTOMER DISPERSIBLE
MAGNETIC IRON OXIDE
Filed Aug. 12, 1954

INVENTOR.
ANDREW SZEGVARI
BY
*Eber J. Hyde*
ATTORNEY

2,719,009

METHOD OF PRODUCING AN ELASTOMER DISPERSIBLE MAGNETIC IRON OXIDE

Andrew Szegvari, Akron, Ohio, assignor to Clevite Corporation, Cleveland, Ohio, a corporation of Ohio Application August 12, 1954, Serial No. 449,383

3 Claims. (Cl. 241—16)

This invention relates to the production of a magnetic iron oxide particularly adapted to uniform dispersion in an elastomer particularly adapted to form endless bands for magnetic recording and reproducing of signals.

An important object of this invention is the production of a magnetic iron oxide readily dispersible in synthetic elastomers.

Another object of this invention is the production of a synthetic elastomer dispersible magnetic iron oxide exhibiting high dispersibility, uniformity and loading when dispersed in a synthetic elastomer.

It has been discovered that a magnetizable band can be produced having high magnetic retentivity, and having a continuous surface of substantial width, exhibiting a minimum amount of head wear by molding a composition of an elastomer having intimately dispersed therein a finely divided magnetic iron oxide prepared according to this invention. While natural rubber may be used it is known to exhibit an excessive amount of aging and deterioration when stored and in use. The synthetic elastomers such as "Neoprene" a trade name for polychloroprene rubbers, "Hycar," a trade name for butadiene-acrylonitrile polymers and "Hypalon," a trade name for chlorosulphonated polyethylene polymers, are to be preferred over natural rubber for these reasons.

Natural rubber is a good dispersing medium for fillers, such as oxides, however, the synthetic elastomers present a difficult dispersing problem. Commercial magnetic iron oxide requires special processing to achieve the necessary dispersing qualities required for producing high quality finished bands. Failure to obtain the required degree of dispersion of the iron oxide in the elastomer produces bands of such inferior quality as to be worthless for recording purposes.

Figure 1:
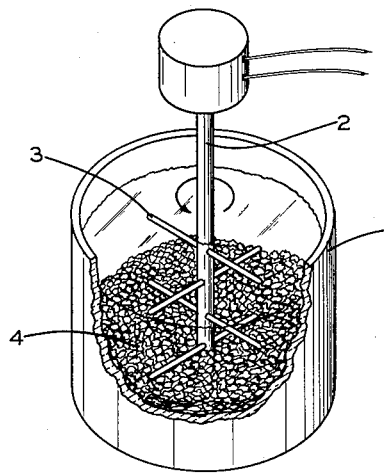
Fig. 1 is a modified ball mill used in grinding commercial magnetic iron oxide.

According to the invention commercial magnetic iron oxide is reduced to substantially uniform particle size by grinding an aqueous slurry thereof in a modified ball mill, shown in Fig. 1. The modified ball mill comprises a cylindrical vertical tank 1 adapted to receive the slurry charge and a quantity of small grinding stones 4. A motor driven agitator 2 having horizontal arms 3 is vertically disposed within tank 1. The oxide slurry contains from 20% to 50% by volume of commercial iron oxide and the grinding stones take up about ⅔ of the total volume of the slurry.

Figure 2:
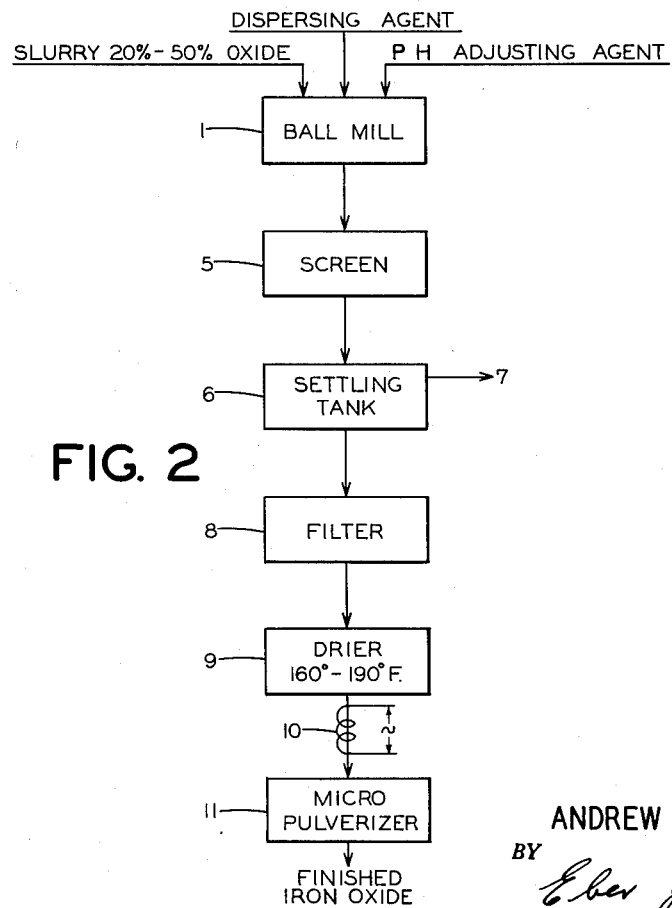
Fig. 2 is a flow diagram of a process according to this invention.

An aqueous slurry of commercial magnetic iron oxide along with a dispersing agent such as lignin sulfonic acid, a formaldehyde condensation product of naphthalene sulfonic acid or tannic acid, in an amount sufficient to produce a dispersing effect, are introduced into the modified ball mill tank 1, Fig. 2. The dispersing agent helps to prevent flocculation and agglomeration of the discrete iron oxide particles during the grinding process. Since the oxide particles assume a negative charge in an aqueous slurry it is desired to increase the strength of the negative charge on the particles to further help prevent the oxide particles from flocculating or agglomerating, since like negatively charged particles repel each other. The strength of the negative charge on the particles may be increased by the addition of an alkali metal hydroxide or a divalent basic alkali metal salt, such as an alkali phosphate or carbonate in an amount sufficient to produce a slurry pH in the range of from 9–10.

The slurry and stones are agitated by a vertically disposed motor driven rotating agitator 2 having horizontally positioned arms 3 attached thereto for about 42 to about 54 hours until virtually all of the oxide is reduced to a size not greater than 0.5 micron. This period of grinding in the modified ball mill is equivalent to about 4 days' grinding in a conventional ball mill.

After removal from the modified ball mill the grinding stones are separated from the slurry in screen 5 and the oxide slurry is introduced into settling tank 6 and allowed to settle for about one week. The bulk of the non-magnetic material remains in suspension, while the magnetic iron oxide tends to flock and settle out possibly due to residual magnetism in addition to other attracting forces. The supernatant liquor is decanted off along with suspended non-magnetic material and dispersing agent through overflow 7. The residual oxide is then filtered in filter 8 and dried at from 160° to 190° F. in drier 9. The dried magnetic oxide is broken up and passed through a micropulverizer 11 to further deflocculate the oxide powder. Since the oxide exhibits a certain amount of residual magnetism the powder must be demagnetized before it will pass through the micropulverizer effectively. This is accomplished by passing the dried powder through an electromagnet 10 energized by an alternating current source. After passing through the electromagnet the individual particles of powder fall freely and will pass through the micropulverizer without collecting on the screen and clogging the exit. The particle size of the finished powder ranges from about 0.3 to 0.5 micron with no particles larger than about 0.5 micron.

The finished oxide can be milled or banbury mixed with a synthetic elastomer and readily disperses therein as a uniform, homogeneous dispersion.

The principles of the invention described above in connection with the specific example thereof, will suggest various modifications to one skilled in the art. It is desired that the invention shall not be limited except by the scope and spirit of the appended claims.

I claim:

1. A process for the production of an elastomer dispersible magnetic iron oxide comprising slurrying a commercial magnetic iron oxide in an aqueous grinding medium, adding thereto a dispersing agent and a pH adjusting agent in an amount sufficient to adjust the pH of the slurry within a pH range of from 9 to 10, subjecting the oxide slurry to grinding until virtually all particles are reduced to a size not greater than 0.5 micron, transferring the ground oxide to a settling tank wherein the magnetic iron oxide settles out, decanting off the supernatant liquor along with the dispersing agent and any suspended nonmagnetic material, filtering the settled oxide to obtain an oxide filter cake, drying the filter cake, breaking up the cake into powder, subjecting the powder to a reversing polarity electromagnetic field to demagnetize the oxide, passing the demagnetized oxide through a micropulverizer to deflocculate the oxide powder into discrete particles and recovering the finished oxide.

2. A process for the production of an elastomer dispersible magnetic iron oxide comprising slurrying a commercial magnetic iron oxide in an aqueous grinding medium adding thereto a dispersing agent and a pH adjusting agent selected from the group consisting of alkali metal hydroxides and divalent alkali metal salts in an amount sufficient to adjust the pH of the slurry within a pH range of from 9 to 10, subjecting the oxide slurry to grinding in a modified ball mill for about 42 to about 54 hours until virtually all particles are reduced to a size not greater than about 0.5 micron, transferring the ground oxide to a settling tank wherein the magnetic iron oxide settles out, decanting off the supernatant liquor along with the dispersing agent and any suspended non-magnetic material, filtering the settled oxide to obtain an oxide filter cake, drying the filter cake at from 160°–190° F., breaking up the cake into a powder, subjecting the powder to a reversing polarity electromagnetic field to demagnetize the oxide, passing the demagnetized oxide through a micropulverizer to deflocculate the oxide powder into discrete particles and recovering the finished oxide.

3. A process for the production of an elastomer dispersible magnetic iron oxide comprising slurrying a commercial magnetic iron oxide in an aqueous grinding medium, adding thereto a dispersing agent selected from the group consisting of lignin sulfonic acid, a formaldehyde condensation product of naphthalene sulfonic acid and tannic acid and a pH adjusting agent selected from the group consisting of alkali metal hydroxides and divalent alkali metal salts in an amount sufficient to adjust the pH of the slurry within a pH range of from 9 to 10, subjecting the slurry to grinding in a modified ball mill for about 42 to 54 hours until virtually all particles are of a size not greater than 0.5 micron, separating the grinding stones from the slurry, transferring the ground oxide to a settling tank wherein the magnetic iron oxide settles out, decanting off the supernatant liquor along with the dispersing agent and any suspended non-magnetic material, filtering the settled oxide to obtain an oxide filter cake, drying the cake at from 160°–190° F., breaking up the cake into a powder, subjecting the powder to a reversing polarity electromagnetic field to demagnetize the oxide, passing the demagnetized oxide through a micropulverizer to deflocculate the oxide powder into discrete particles and recovering the finished oxide.

No references cited.